US010531256B2

(12) United States Patent
Nguyen et al.

(10) Patent No.: US 10,531,256 B2
(45) Date of Patent: Jan. 7, 2020

(54) ELEVATOR WIRELESS COMMUNICATION AND POWER TRANSFER SYSTEM

(71) Applicant: OTIS ELEVATOR COMPANY, Farmington, CT (US)

(72) Inventors: Dang V. Nguyen, South Windsor, CT (US); Suman Dwari, Vernon, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 173 days.

(21) Appl. No.: 15/254,588

(22) Filed: Sep. 1, 2016

(65) Prior Publication Data

US 2017/0057780 A1    Mar. 2, 2017

Related U.S. Application Data

(60) Provisional application No. 62/212,798, filed on Sep. 1, 2015.

(51) Int. Cl.
| | | |
|---|---|---|
| *B66B 11/04* | (2006.01) | |
| *H02K 41/02* | (2006.01) | |
| *H04W 4/70* | (2018.01) | |
| *H04B 5/00* | (2006.01) | |

(52) U.S. Cl.
CPC ........... *H04W 4/70* (2018.02); *B66B 11/0407* (2013.01); *H04B 5/0031* (2013.01); *H04B 5/0087* (2013.01)

(58) Field of Classification Search
USPC ........................................................ 187/250
See application file for complete search history.

(56) References Cited

U.S. PATENT DOCUMENTS

| 5,393,941 A | 2/1995 | Mizuno et al. |
| 5,732,795 A | 3/1998 | McCarthy et al. |
| 6,408,986 B1 | 6/2002 | Ayano et al. |
| (Continued) | | |

FOREIGN PATENT DOCUMENTS

| CN | 1410335 A | 4/2003 |
| CN | 101902081 A | 12/2010 |
| (Continued) | | |

OTHER PUBLICATIONS

Extended European Search Report for Application No. 16186582. 9-1731 dated Jan. 20, 2017 (7 pages).

*Primary Examiner* — Christopher Uhlir
(74) *Attorney, Agent, or Firm* — Cantor Colburn LLP

(57) ABSTRACT

An elevator system includes an elevator car disposed in and arranged to move along a hoistway. A linear propulsion system of the elevator system is constructed and arranged to propel the elevator car, and includes a plurality of primary coils engaged to and distributed along the hoistway generally defined by a stationary structure. A wireless power transfer system of the elevator system is configured to inductively transfer power to the elevator car. The wireless power transfer system includes a secondary coil mounted to the elevator car and is configured to be induced with electromotive forces by the primary coils and output power for use by the elevator car. A communication system of the elevator system is configured to utilize the secondary coil and the plurality of primary coils to exchange a communication data signal.

16 Claims, 4 Drawing Sheets

(56) References Cited

U.S. PATENT DOCUMENTS

| | | | |
|---|---|---|---|
| 6,412,604 B1* | 7/2002 | Schuster | B66B 1/30 |
| | | | 187/290 |
| 6,467,585 B1 | 10/2002 | Gozzo et al. | |
| 6,481,531 B1 | 11/2002 | Nagura et al. | |
| 6,515,878 B1* | 2/2003 | Meins | B60L 5/005 |
| | | | 363/37 |
| 6,554,107 B2 | 4/2003 | Yumura et al. | |
| 6,601,679 B2 | 8/2003 | Crenella et al. | |
| 6,952,086 B1* | 10/2005 | Krefta | H02K 17/30 |
| | | | 318/135 |
| 7,134,530 B2 | 11/2006 | Motoyama et al. | |
| 7,479,861 B2 | 1/2009 | Zepke et al. | |
| 8,111,042 B2 | 2/2012 | Bennett | |
| 8,123,003 B2 | 2/2012 | Meri et al. | |
| 8,164,925 B2* | 4/2012 | Abe | H02J 5/005 |
| | | | 363/21.02 |
| 9,397,518 B1* | 7/2016 | Theobald | H02J 7/025 |
| 9,490,726 B2* | 11/2016 | Tanaka | H02M 3/33538 |
| 2012/0133215 A1* | 5/2012 | Lai | H01F 38/14 |
| | | | 307/104 |
| 2013/0018639 A1* | 1/2013 | Sakai | B66B 1/285 |
| | | | 703/2 |
| 2016/0304313 A1* | 10/2016 | Kinnari | B66B 5/0018 |

FOREIGN PATENT DOCUMENTS

| | | |
|---|---|---|
| JP | H05338960 A | 12/1993 |
| JP | 2000063050 A | 2/2000 |
| JP | 2003256974 A | 9/2003 |
| WO | 2010112675 A2 | 10/2010 |
| WO | 2014113006 A1 | 7/2014 |
| WO | 2014189492 A1 | 11/2014 |
| WO | 2015084367 A1 | 6/2015 |

* cited by examiner

ELEVATOR WIRELESS COMMUNICATION AND POWER TRANSFER SYSTEM

CROSS REFERENCE TO RELATED APPLICATION

This application claims priority to U.S. Provisional Patent Application No. 62/212,798, filed Sep. 1, 2015, the entire contents of which is incorporated herein by reference.

BACKGROUND

The present disclosure relates to elevator systems, and more particularly to a communication system integrated with wireless power transfer system of the elevator system.

Traveling electrical cables are traditionally used to power and to communicate with non-stationary elevator cars of an elevator system. The moving cable based solution is disadvantageous for long and fast motions, due to its mechanical and electrical limitations. Furthermore, for communication between the controller and the car, channels separate from the power line used. For position sensing of the car, conventionally, exclusive sensors such as resolver and, rotary position sensors on, for example, the motor shaft are used in combination with magnetic vane sensors mounted on the elevator car. In cases where the elevator car is propelled by linear motors, Hall Effect sensors mounted on linear motor primary structures may be used. Such solutions are not suitable for very high rise elevators. Also, conventional wireless communication solutions have many challenges in implementation, robustness, and other challenges.

SUMMARY

An elevator system according to one, non-limiting, embodiment of the present disclosure includes an elevator car disposed in and constructed and arranged to move along a hoistway; a linear propulsion system constructed and arranged to propel the elevator car, the linear propulsion system including a plurality of primary coils engaged to and distributed along the hoistway generally defined by a stationary structure; a wireless power transfer system configured to inductively transfer power to the elevator car, the wireless power transfer system including a secondary coil mounted to the elevator car and configured to be induced with electromotive forces by the plurality of primary coils and output power for use by the elevator car; and a communication system configured to utilize the secondary coil and the plurality of primary coils to exchange a communication data signal.

Additionally to the foregoing embodiment, the communication system includes a first communication device carried by the elevator car and configured to receive communication data and output a communication data signal to the secondary coil.

In the alternative or additionally thereto, in the foregoing embodiment, the first communication device is an intelligent signal modulator.

In the alternative or additionally thereto, in the foregoing embodiment, the communication system includes a second communication device supported by the stationary structure and in communication with a controller of the linear propulsion system configured to selectively control energization the plurality of primary coils.

In the alternative or additionally thereto, in the foregoing embodiment, the second communication device is a demodulator.

In the alternative or additionally thereto, in the foregoing embodiment, the communication system includes a position sensor supported by the elevator car and configured to output a position signal to the first communication device.

In the alternative or additionally thereto, in the foregoing embodiment, the position sensor is an accelerometer.

In the alternative or additionally thereto, in the foregoing embodiment, the communication system includes a sensor supported by the elevator car and configured to output a signal to the first communication device, and wherein the sensor is at least one of a moisture sensor, a pressure sensor, a sound sensor, a light sensor and an occupancy sensor.

In the alternative or additionally thereto, in the foregoing embodiment, the plurality of primary coils are configured to transmit power to the secondary coil when a primary coil of the plurality of primary coils is adjacent to the secondary coil and is selectively energized.

In the alternative or additionally thereto, in the foregoing embodiment, the linear propulsion system includes a control system configured to select and energize the plurality of primary coils, the control system including a plurality of switches with each one of the plurality of switches being associated with a respective one of the plurality of primary coils, and wherein the plurality of switches selectively close to energize a selected one of the plurality of resonant primary coils associated with a location of the elevator car.

In the alternative or additionally thereto, in the foregoing embodiment, the communication system is configured to send the communication signal through a selected one of the plurality of switches when closed.

In the alternative or additionally thereto, in the foregoing embodiment, the control system includes a controller configured to control the plurality of switches for selective energization of the plurality of resonant primary coils based on a location of the elevator car.

In the alternative or additionally thereto, in the foregoing embodiment, the communication system includes an intelligent signal modulator carried by the elevator car and configured to receive communication data and output the communication data signal to the secondary coil, and a demodulator supported by the stationary structure and in communication with the controller of the linear propulsion system.

In the alternative or additionally thereto, in the foregoing embodiment, the communication system includes a position sensor supported by the elevator car and configured to output a position signal to the first communication device.

In the alternative or additionally thereto, in the foregoing embodiment, the communication data includes at least one of elevator car position, safety-related information, fault detection, health monitoring, and information exchange.

In the alternative or additionally thereto, in the foregoing embodiment, the power transfer system include a power converter carried by the elevator car and configured to receive the communication data signal from the first communication device.

In the alternative or additionally thereto, in the foregoing embodiment, the power converter provides AC power to AC loads of the elevator car.

A wireless communication system for exchanging communication data with an elevator car constructed to move in a hoistway, the wireless communication system according to another, non-limiting, embodiment includes an intelligent signal modulator mounted to the elevator car and configured to receive an elevator car communication data signal; a secondary coil mounted to the elevator car and configured to induce a current for elevator car power and receive the communication data signal from the intelligent signal modulator; a plurality of primary coils distributed along the hoistway; and configured to transmit power to the secondary coil when a primary coil of the plurality of primary coils is proximate to the secondary coil and is selectively energized, and to receive the communication data signal from the second coil; and a demodulator configured to receive the communication data signal from the plurality of primary coils.

Additionally to the foregoing embodiment, the demodulator outputs the communication data signal to a controller.

In the alternative or additionally thereto, in the foregoing embodiment, the intelligent signal modulator outputs the communication data signal to a power converter in the elevator car that is configured to output the communication data signal to the secondary coil.

In the alternative or additionally thereto, in the foregoing embodiment, the wireless communication system includes a plurality of communication modules with each one of the communication modules associated with a respective one of the plurality of primary coils, and wherein the plurality of communication modules are configured to selectively receive the communication data signal from the respective primary coil and output the communication data signal to the demodulator.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
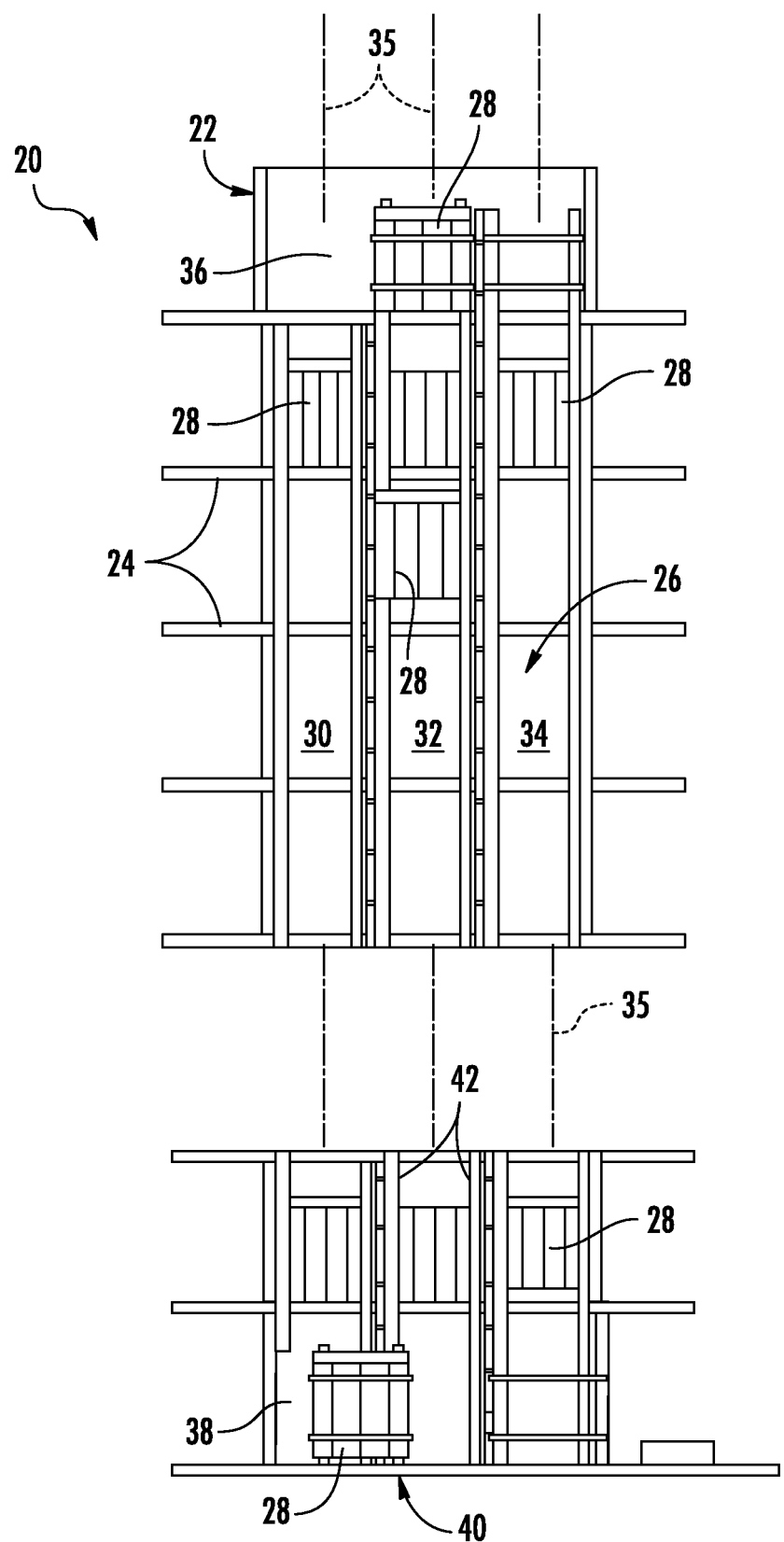
FIG. 1 depicts a multicar elevator system in an exemplary embodiment.

FIG. 1 depicts a self-propelled or ropeless elevator system 20 in an exemplary embodiment that may be used in a structure or building 22 having multiple levels or floors 24. Elevator system 20 includes a hoistway 26 having boundaries defined by the structure 22 and at least one car 28 adapted to travel in the hoistway 26. The hoistway 26 may include, for example, three lanes 30, 32, 34 each extending along a respective centerline 35 with any number of cars 28 traveling in any one lane and in any number of travel directions. For example and as illustrated, the cars 28 in lanes 30, 34, may travel in an up direction and the cars 28 in lane 32 may travel in a down direction along the centerline 35. Moreover, the cars 28 may travel horizontally along a centerline 35 within upper and lower transfer stations 36, 38.

Above the top floor 24 may be the upper transfer station 36 that facilitates horizontal motion to elevator cars 28 for moving the cars between lanes 30, 32, 34. Below the first floor 24 may be the lower transfer station 38 that facilitates horizontal motion to elevator cars 28 for moving the cars between lanes 30, 32, 34. It is understood that the upper and lower transfer stations 36, 38 may be respectively located at the top and first floors 24 rather than above and below the top and first floors, or may be located at any intermediate floor. Yet further, the elevator system 20 may include one or more intermediate transfer stations (not illustrated) located vertically between and similar to the upper and lower transfer stations 36, 38.

Figure 2:
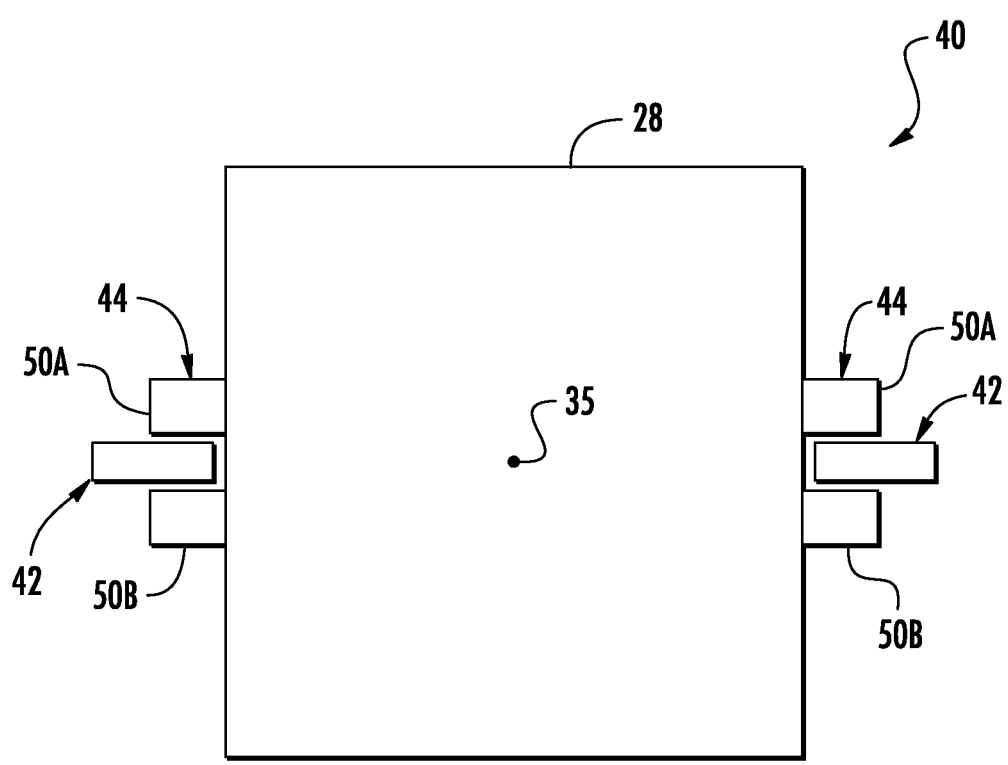
FIG. 2 is a top down view of a car and portions of a linear propulsion system in an exemplary embodiment.
Figure 3:
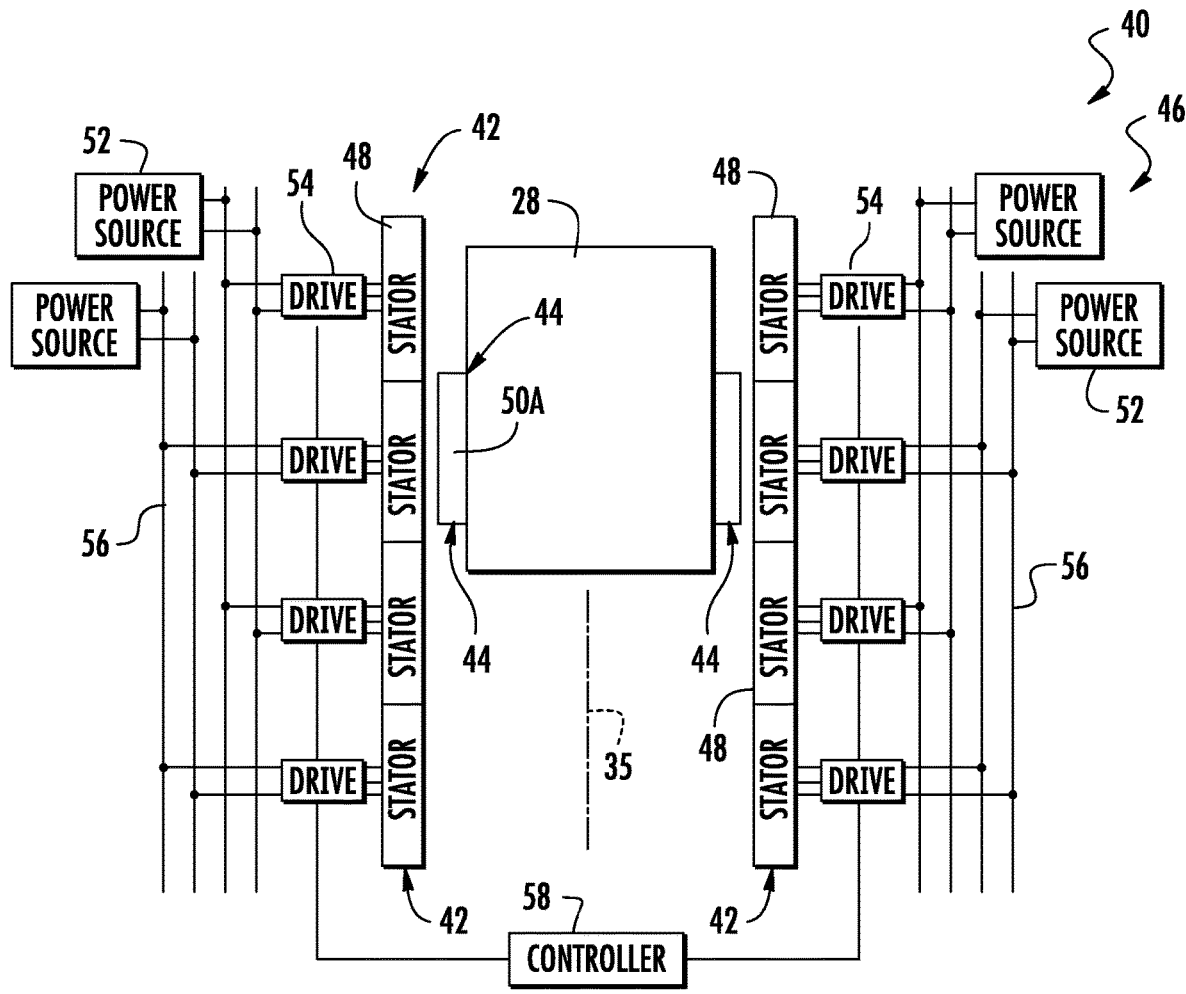
FIG. 3 is a schematic of the linear propulsion system.
Figure 4:
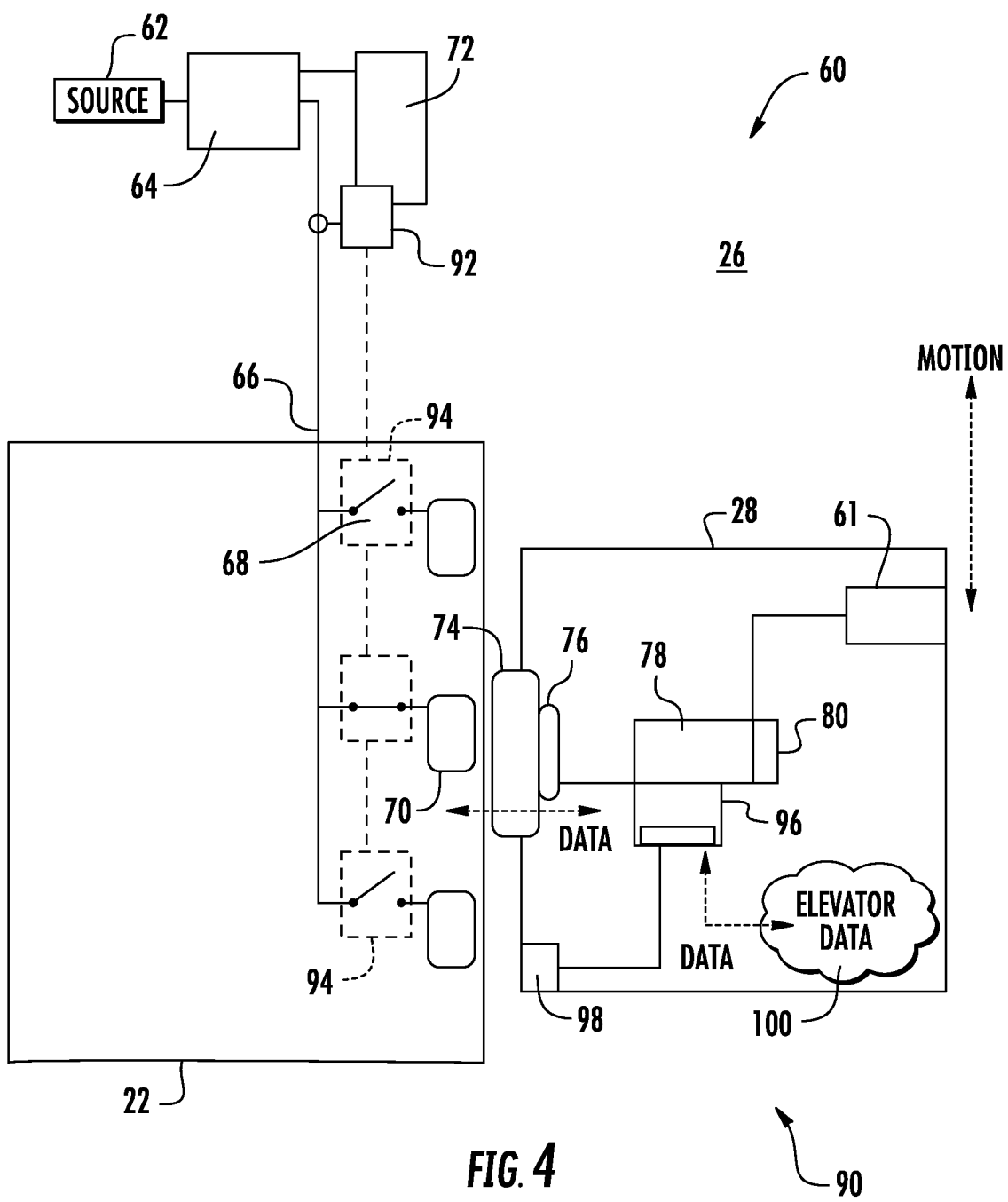
FIG. 4 is a schematic of a wireless power transfer system combined with a communication system of the elevator system.

Referring to FIGS. 1 through 3, cars 28 are propelled using a linear propulsion system 40 having at least one, fixed, primary portion 42 (e.g., two illustrated in FIG. 2 mounted on opposite sides of the car 28), moving secondary portions 44 (e.g., two illustrated in FIG. 2 mounted on opposite sides of the car 28), and a control system 46 (see FIG. 4). The primary portion 42 includes a plurality of windings or coils 48 mounted at one or both sides of the lanes 30, 32, 34 in the hoistway 26. Each secondary portion 44 may include two rows of opposing permanent magnets 50A, 50B mounted to the car 28. Primary portion 42 is supplied with drive signals from the control system 46 to generate a magnetic flux that imparts a force on the secondary portions 44 to control movement of the cars 28 in their respective lanes 30, 32, 34 (e.g., moving up, down, or holding still). The plurality of coils 48 of the primary portion 42 may generally be located between and spaced from the opposing rows of permanent magnets 50A, 50B. It is contemplated and understood that any number of secondary portions 44 may be mounted to the car 28, and any number of primary portions 42 may be associated with the secondary portions 44 in any number of configurations.

Referring to FIG. 3, the control system 46 may include power sources 52, drives 54, buses 56 and a controller 58. The power sources 52 are electrically coupled to the drives 54 via the buses 56. In one non-limiting example, the power sources 52 may be direct current (DC) or alternating current (AC) power sources. DC power sources 52 may be implemented using storage devices (e.g., batteries, capacitors), and may be active devices that condition power from another source (e.g., rectifiers). AC power sources may be implemented using a power grid or an alternator. The drives 54 may receive DC power from the buses 56 and may provide drive excitation to the primary portions 42 of the linear propulsion system 40. Each drive 54 may be a converter that converts DC power from bus 56 to a multi-phase (e.g., three phase) drive excitation provided to a respective section of the primary portions 42. The primary portion 42 is divided into a plurality of modules or sections, with each section associated with a respective drive 54.

The controller 58 provides control signals to each of the drives 54 to control generation of the drive signals. Controller 58 may use pulse width modulation (PWM) control signals to control generation of the drive signals by drives 54. Controller 58 may be implemented using a digital signal processor-based device programmed to generate the control signals. The controller 58 may also be part of an elevator control system or elevator management system. Elements of the control system 46 may be implemented in a single, integrated module, and/or be distributed along the hoistway 26.

Referring to FIG. 4, a wireless power transfer system 60 of the elevator system 20 may be used to power loads 61 in or on the elevator car 28. The power transfer system 60 may be an integral part of the control system 46 thereby sharing various components such as the controller 58, buses 56, power source 52 and portions of the linear propulsion system 40 such as the primary portion 42 and other components. Alternatively, the wireless power transfer system 60 may generally be independent of the control system 46 and/or linear propulsion system 40. The power loads 61 may be alternating current (AC) loads such as a fan motor, utilizing a traditional power frequency, for example, about sixty (60) Hz. Alternatively, or in addition thereto, the loads 61 may include direct current (DC) loads such as on-car controllers, relays, LED lights, and a holding brake.

The wireless power transfer system 60 may include a power source 62, a converter 64 that may be a high frequency converter, at least one conductor 66 for transferring power (e.g., high frequency power) from the converter 64, a plurality of switches 68, and a plurality of resonant primary coils 70 that may generally be the primary portion 42. Each one of the resonant primary coils 70 are associated with a respective one of the plurality of switches 68. The power transfer system 60 may further include a controller 72 that may be part of the controller 58. The controller 72 may be configured to selectively and sequentially place and/or maintain the switches 68 in an off position (i.e., circuit open) and/or in an on position (i.e., circuit closed). The power source 62 may be the power source 52 and may further be of a DC or of an AC type with any frequency (i.e. low or high).

The converter 64 may be configured to convert the power outputted by the power source 62 to a high frequency power for the controlled and sequential energization of the resonant primary coils 70 by transmitting the high frequency power through the conductors 66. More specifically, if the power source 62 is a DC power source, the converter 64 may convert the DC power to an AC power and at a prescribed high frequency. If the power source 62 is an AC power source with, for example, a low frequency such as 60 Hz, the converter 64 may increase the frequency to a desired high frequency value. For the present disclosure, a desired high frequency may fall within a range of about 1 kHz to 1 MHz, and preferably within a range of about 50 kHz to 500 kHz. It is further contemplated and understood that for transferring data over power, the band width of the communication (i.e., the amount of data that can be transferred per second) is dictated, at least in-part, by this frequency.

The wireless power transfer system 60 may further include components generally in or carried by the elevator car 28. Such components may include a resonant secondary coil 74 configured to induce a current when an energized resonant primary coil 70 is proximate thereto, a resonant component 76 that may be active and/or passive, a power converter 78 to regulate voltage from the resonant secondary coil, and an energy storage device 80 that may be utilized to store power for the AC or DC loads 61. The resonant secondary coil 74 may be induced with an electro-motive force (EMF) or voltage when the coil is proximate to an energized resonant primary coil 74. The resonant primary coil 70 is energized when the respective switch 68 is closed based on the proximity of the elevator car 28 and resonant secondary coil 74.

Each switch 68 may be controlled by the controller 72 over pathways 82 that may be hard-wired or wireless. Alternatively, or some combination thereof, the switches 68 may be smart switches each including a sensor 84 that senses a parameter indicative of the proximity of the resonant secondary coil 74. For example, the sensor 84 may be an inductance sensor configured to sense a change of inductance across the associated resonant primary coil 70 indicative of a proximate location of the resonant secondary coil 74. Alternatively, the sensor 84 may be a capacitance sensor configured to sense a change of capacitance across the associated resonant primary coil 70 indicative of a proximate location of the resonant secondary coil 74. In another embodiment, the controller 72 may assume limited control and the switches 68 may still be smart switches. For example, the controller 72 may control the duration that a given switch remains closed; however, the switches are 'smart' in the sense that they may be configured to move to the closed or open position based on its local intelligence with or without the controller instruction to do so.

The AC voltage induced across the resonant secondary coil 74 is generally at the high frequency of the resonant primary coil 70. The ability to energize the resonant primary coils 70 with the high frequency power (i.e., as oppose to low frequency) may optimize the efficiency of induced power transfer from the resonant primary coil 70 to the resonant secondary coil 74. Moreover, the high frequency power generally facilitates the reduction in size of many system components such as the coils 70, 74, the resonant component 76 and the converter 78 amongst others. Reducing the size of components improves packaging of the system and may reduce elevator car 28 weight.

The resonant component 76 may be passive with a fixed value or with an actively controlled variable value. As a passive resonant component 76, the component is generally capacitive in nature (e.g., a capacitor) and capable of operating with AC power. As an active resonant component 76, the component 76 is configured to mitigate the effects of a weak or variable coupling factor (i.e., varies when the resonant secondary coil 74 passes between resonant primary coils 70). That is, the resonant component 76 may be configured or operated in such a fashion that it can control the output current and voltage, and hence, power from the resonant secondary coil 74.

The power converter 78 is configured to process power at a high frequency, received from the resonant component 76. The converter 78 may process the high frequency power to a desirable frequency power (e.g., low power frequency of about sixty (60) Hz or other) that is compatible with AC loads 61 in the elevator car 28. The converter 78 may further function to convert the high frequency power to DC power, which is then stored in the energy storage device 80. An example of an energy storage device may be a type of battery.

The elevator system 20 may further include a communication system 90 that may generally share the primary coils 48 of the primary portions 42 with the linear propulsion system 40 and the power transfer system 60, and share the secondary coil 74 with the power transfer system 60. The communication system 90 may further include a first communication device 92 that may be in direct communication with or integral to the controller 72, a plurality of communication modules 94 with each module generally associated with a respective switch 68 and/or primary coil 70, a second communication device 96 generally supported by and/or positioned within the elevator car 28, an elevator car position sensor 98 and an elevator car data link 100.

The communication device 92 may, as one non-limiting example, be a demodulator, and may generally be in and supported by the stationary structure 22. The communication device 96 may, as one non-limiting example, be an intelligent signal modulator, and may generally be in and/or supported by the elevator car 28. The modulation may be accomplished by switching a capacitive load before the input of the converter 78, or by switching a resistive load at the output of converter 78. The switching sequence may employ an encoding scheme such as differential bi-phase encoding. The transmitted data signal is received by the communication device 92 by sensing voltage, current or impedance at the primary coils. The received signal may be demodulated by the communication device 92 or by the communication modules 94 to extract the transmitted data by the communication device 96. The communication modules 94 generally operate in tandem with the control of the switches 68. More specifically, the modules 94 are configured to communicate between the primary coils 48 of the primary portions 42 such that the switches 68 are activated based upon the proximity of the elevator car to the primary coils. Furthermore, the modules 94 may be configured to each other and the communication device 92, such that data received by various primary coils 48 at different moving or stationary positions of the elevator car 28 may be combined and collectively utilized.

The communication device 96 is configured to receive data input from the position sensor 98 (e.g., accelerometer) for sending elevator car position data to the controller 72. Further, the communication device 96 may receive any other type of data from the elevator car via the communication link 100 and any variety of other sensors. Such data may include or is otherwise associated with fault detection, safety-related information, health monitoring, ride comfort, pressure, temperature, moisture, occupancy, and other data.

In operation, the wireless communication link between modules 94 in the hoistway 26 and the elevator car 28 may be established simultaneously during the transfer of wireless power or the communication can be carried out in a time sliced or sequential manner with the wireless power transfer. For the first case, the communication signal is super-imposed over the power signal by applying various modulation techniques, for example, load modulation or impedance modulation. For the latter case, suitable analog and digital modulation techniques may be used for the data transfer.

The wireless power transfer system 60 is thus utilized as a communication channel with multi-functionality. Other benefits may include position sensing of the elevator car 28 that may be carried out to improve safety reliability of the elevator operation, and a communication channel that may provide a robust link for exchanging data with the car and to improve the quality, reliability, and safety of the elevator system 20. Furthermore, the communication device 90 may be integrated with other sensors for any variety of uses.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. An elevator system, comprising:
    an elevator car disposed in and constructed and arranged to move along a hoistway;
    a linear propulsion system constructed and arranged to propel the elevator car, the linear propulsion system including a plurality of primary coils engaged to and distributed along the hoistway generally defined by a stationary structure;
    a wireless power transfer system configured to inductively transfer power to the elevator car, the wireless power transfer system including a secondary coil and a resonant component, the secondary coil being mounted to the elevator car and configured to be sequentially induced with electromotive forces by each one of the plurality of primary coils and output power for use by the elevator car, and the resonant component being mounted to the elevator car, operably coupled to the secondary coil, and configured to mitigate effects of a variable coupling factor as the secondary coil passes between adjacent primary coils of the plurality of primary coils; and
    a communication system configured to utilize the secondary coil and the plurality of primary coils to exchange a communication data signal, wherein the plurality of primary coils are configured to transmit power to the secondary coil when a primary coil of the plurality of primary coils is adjacent to the secondary coil and is selectively energized as the elevator car is propelled via the linear propulsion system.

2. The elevator system set forth in claim 1, wherein the communication system includes a first communication device carried by the elevator car and configured to receive communication data and output a communication data signal to the secondary coil.

3. The elevator system set forth in claim 2, wherein the first communication device is an intelligent signal modulator.

4. The elevator system set forth in claim 3, wherein the communication system includes a second communication device supported by the stationary structure and in communication with a controller of the linear propulsion system configured to selectively control energization of the plurality of primary coils.

5. The elevator system set forth in claim 4, wherein the second communication device is a demodulator.

6. The elevator system set forth in claim 2, wherein the communication system includes a position sensor supported by the elevator car and configured to output a position signal to the first communication device.

7. The elevator system set forth in claim 6, wherein the position sensor is an accelerometer.

8. The elevator system set forth in claim 2, wherein the communication system includes a sensor supported by the elevator car and configured to output a signal to the first communication device, and wherein the sensor is at least one of a moisture sensor, a pressure sensor, a sound sensor, a light sensor and an occupancy sensor.

9. The elevator system set forth in claim 1, wherein the linear propulsion system includes a control system configured to select and energize the plurality of primary coils, the control system including a plurality of switches with each one of the plurality of switches being associated with a respective one of the plurality of primary coils, and wherein the plurality of switches selectively close to energize a selected one of the plurality of primary coils for simultaneous propulsion and inductive energy transfer, and associated with a location of the elevator car.

10. The elevator system set forth in claim 9, wherein the communication system is configured to send the communication signal through a selected one of the plurality of switches when closed.

11. The elevator system set forth in claim 10, wherein the control system includes a controller configured to control the plurality of switches for selective energization of the plurality of primary coils based on a location of the elevator car.

12. The elevator system set forth in claim 11, wherein the communication system includes an intelligent signal modulator carried by the elevator car and configured to receive communication data and output the communication data signal to the secondary coil, and a demodulator supported by the stationary structure and in communication with the controller of the linear propulsion system.

13. The elevator system set forth in claim 12, wherein the communication system includes a position sensor supported by the elevator car and configured to output a position signal to the first communication device.

14. The elevator system set forth in claim 1, wherein the communication data includes at least one of elevator car position, safety-related information, fault detection, health monitoring, and information exchange.

15. The elevator system set forth in claim 2, wherein the power transfer system include a power converter carried by the elevator car and configured to receive the communication data signal from the first communication device.

16. The elevator system set forth in claim 15, wherein the power converter provides AC power to AC loads of the elevator car.

* * * * *